(12) United States Patent
Miller et al.

(10) Patent No.: US 7,523,128 B1
(45) Date of Patent: Apr. 21, 2009

(54) METHOD AND SYSTEM FOR DISCOVERING RELATIONSHIPS

(75) Inventors: Clint Miller, Austin, TX (US); Ray Renteria, Pflugerville, TX (US); Mark Castoe, Cedar Park, TX (US); Daniel Rodney, Austin, TX (US); Craig Dalton, Austin, TX (US); Shad Reynolds, Austin, TX (US); Jeff Ellerbee, Austin, TX (US)

(73) Assignee: Troux Technologies, Austin, TX (US)

( * ) Notice: Subject to any disclaimer, the term of this patent is extended or adjusted under 35 U.S.C. 154(b) by 704 days.

(21) Appl. No.: 10/802,178

(22) Filed: Mar. 17, 2004

Related U.S. Application Data

(60) Provisional application No. 60/455,522, filed on Mar. 18, 2003.

(51) Int. Cl.
*G06F 17/00* (2006.01)
*G06F 15/16* (2006.01)

(52) U.S. Cl. .................. 707/102; 707/4; 707/101; 709/206

(58) Field of Classification Search ................ 707/100
See application file for complete search history.

(56) References Cited

U.S. PATENT DOCUMENTS

| | | | | |
|---|---|---|---|---|
| 5,572,732 | A * | 11/1996 | Fant et al. | 717/104 |
| 6,226,792 | B1 * | 5/2001 | Goiffon et al. | 717/120 |
| 6,442,557 | B1 | 8/2002 | Buteau | |
| 6,509,898 | B2 | 1/2003 | Chi et al. | |
| 6,611,838 | B1 * | 8/2003 | Ignat et al. | 707/101 |
| 6,662,188 | B1 * | 12/2003 | Rasmussen et al. | 707/102 |
| 7,103,171 | B1 * | 9/2006 | Annadata et al. | 379/265.12 |
| 2003/0110253 | A1 * | 6/2003 | Anuszczyk et al. | 709/224 |
| 2003/0177481 | A1 | 9/2003 | Amaru | |
| 2003/0212640 | A1 | 11/2003 | Andresen et al. | |
| 2004/0002818 | A1 | 1/2004 | Kulp et al. | |
| 2004/0049509 | A1 | 3/2004 | Keller | |
| 2004/0073655 | A1 * | 4/2004 | Kan et al. | 709/224 |
| 2004/0111513 | A1 * | 6/2004 | Shen | 709/226 |
| 2004/0225791 | A1 * | 11/2004 | Keskar et al. | 710/300 |
| 2005/0033762 | A1 | 2/2005 | Kasravi | |
| 2005/0138039 | A1 | 6/2005 | Hagen | |
| 2005/0203920 | A1 | 9/2005 | Deng | |

(Continued)

OTHER PUBLICATIONS

United States Patent Office Action mailed Jun. 18, 2007 issued in U.S. Appl. No. 10/802,304.

(Continued)

*Primary Examiner*—Cam Y T Truong
*Assistant Examiner*—Dung K Chau
(74) *Attorney, Agent, or Firm*—Sprinkle IP Law Group

(57) ABSTRACT

Embodiments of the present invention provide systems and methods for relationship discovery. According to one embodiment of the present invention, arbitrarily complex relationship discovery rules can be applied to components in a data model to determine if a relationship exists between the components. If the components satisfy a relationship discovery rule, a relationship can be established for the components. Because the relationships are established based on the application of relationship discovery rules rather than through enforcement of a database schema, new relationships and relationship types can be established without having to alter the underlying database schema. Additionally, because rules can be repetitively applied, relationships can be established, deleted and updated as the system being modeled changes.

25 Claims, 12 Drawing Sheets

U.S. PATENT DOCUMENTS

2006/0106796 A1 5/2006 Venkataraman
2006/0136437 A1 6/2006 Yamasaki
2006/0167927 A1 7/2006 Edelstein et al.
2006/0195460 A1 8/2006 Nori
2006/0277022 A1 12/2006 Pulfer
2007/0192415 A1* 8/2007 Pak .............................. 709/206

OTHER PUBLICATIONS

United States Patent Office Action mailed Jan. 9, 2008 issued in U.S. Appl. No. 10/802,304.
United States Patent Official Action mailed Oct. 4, 2006, issued in U.S. Appl. No. 10/803,133, Clint Miller.
United States Patent Official Action mailed May 17, 2007, issued in U.S. Appl. No. 10/803,133, Clint Miller.
United States Patent Official Action mailed Nov. 2, 2007, issued in U.S. Appl. No. 10/803,133, Clint Miller.
United States Patent Official Action mailed Mar. 3, 2008 issued in U.S. Appl. No. 11/095,323, William C. Cason, JR.
Office Action issued in U.S. Appl. No. 11/095,323 dated Aug. 10, 2007.
Office Action issued in U.S. Appl. No. 10/802,304 dated Jun. 30, 2008.
Office Action issued in U.S. Appl. No. 10/803,133 dated May 28, 2008.
Office Action issued in U.S. Appl. No. 11/095,323 dated Aug. 20, 2008.
Office Action issued in U.S. Appl. No. 11/117,039 issued Aug. 20, 2008.
Office Action issued in U.S. Appl. No. 11/198,649 issued Apr. 29, 2008.
Muller, Robert, "Database Design for Smarties Using UML for Data Modeling", Morgan Kaufmann Publishers, 265 pages, 1999.
Office Action issued in U.S. Appl. No. 10/803,133 dated Oct. 7, 2008.

* cited by examiner

1100

| ComponentTypeID | Name |
|---|---|
| 1 | ServerComputerType |

| PropertyDefinition | Name | ComponentTypeID |
|---|---|---|
| 1 | RAM | 1 |
| 2 | OSType | 1 |
| 3 | CPU Type | 1 |
| 4 | FreeStorage | 1 |

| ComponentID | Name | ComponentTypeID |
|---|---|---|
| 1 | Server1 | 1 |
| 2 | Server2 | 1 |

| ComponentID | PropertyDefinitionID | Value |
|---|---|---|
| 1 | RAM | 512 |
| 1 | OSType | Solaris |
| 1 | OSType | PowerPC |
| 1 | FreeStorage | 6 |
| 2 | RAM | 384 |
| 2 | OSType | Solaris1 |
| 2 | CPUType | PowerPC |
| 2 | FreeStorage | 14 |

*FIG. 14*

| PropertyDefinition | Name | ComponentTypeID |
|---|---|---|
| 1 | RAM | 1 |
| 2 | OSType | 1 |
| 3 | CPUType | 1 |
| 4 | FreeStorage | 1 |
| 5 | Cache | 1 |

*FIG. 15*

| ComponentID | PropertyDefinitionID | Value |
|---|---|---|
| 1 | RAM | 512 |
| 1 | OSType | Solaris |
| 1 | CPUType | PowerPC |
| 1 | FreeStorage | 6 |
| 2 | RAM | 384 |
| 2 | OSType | Solaris |
| 2 | CPUType | PowerPC |
| 2 | FreeStorage | 14 |
| 1 | Cache | 2 |
| 2 | Cache | 1 |

*FIG. 16*

METHOD AND SYSTEM FOR DISCOVERING RELATIONSHIPS

RELATED APPLICATIONS

This application claims priority under 35 U.S.C. § 119(e) to U.S. Provisional Patent Application No. 60/455,522, entitled "System and Method for Collecting, Modeling and Querying Information Technology Information" by Miller, et al., filed on Mar. 18, 2003, which is hereby fully incorporated by reference herein. This application is related to U.S. patent application Ser. No. 10/803,133, entitled "Method and System for Querying an Applied Data Model" by Miller et al., filed Mar. 17, 2004 and U.S. patent application Ser. No. 10/802,304, entitled "Method and System For a Generic Data Model" by Miller et al., filed Mar. 17, 2004, each of which is fully incorporated by reference herein.

TECHNICAL FIELD OF THE INVENTION

Embodiments of the present invention relate in general to managing relationships, and more particularly, to determining relationships between entities of an arbitrarily complex system.

BACKGROUND OF THE INVENTION

Natural and manmade systems include interrelated entities working together in typically complex manners. System models provide an abstraction of the system for better understanding of the entities and their relationships. Models are used in a variety of disciplines to identify problems or inefficiencies in a particular system, anticipate failures in the system so that the system can be reconfigured or provide insight as to why a particular failure occurred. In the field of architecture, for example, computer models aid architectural engineers in visualizing how structural members of a building physically fit together and how the members statically and dynamically interact under various conditions. These models can help the engineer minimize the potential for catastrophic building failure.

Over the past several decades, information technology ("IT") systems have become important to most private and governmental organizations. For most large organizations, IT systems are essential for the day-to-day operations of the organization. Many IT systems evolve in a hodge-podge manner, with various computers and software programs being deployed at different times, leading to a highly heterogeneous system. Without careful planning, the installation of new computers and software applications can lead to instability in the IT system, causing computer crashes, program crashes and other errors. To further complicate matters, IT systems are prone to communication outages, malicious code outbreaks, incompatible software installations by users and a variety of other problems. An error or instability in one portion of the IT system can, at one end of the spectrum, cause annoyance for a small number of users and, at the other end, cripple the organization.

Because IT environments augment and evolve, modeling these environments to identify or predict problems can be time consuming and difficult. In particular, identifying and managing changing relationships between entities in the IT environment is problematic. Two primary methods are currently employed to model IT environments. The first method involves diagramming the IT environment using a computer drafting program such as Microsoft VISIO (Microsoft and VISIO are trademarks of Redmond, Wash. based Microsoft Corp.) or listing hardware and software using a spreadsheet. The network diagram or spreadsheet provides an inventory of hardware assets and software programs that exist in the IT environment. This solution is generally insufficient for managing relationships between entities, particularly in large IT systems, because the graphical representations or spreadsheet data must be manually deciphered to derive relationships. Another problem with modeling an IT environment through documents is that potentially hundreds of IT personnel need to update those documents. If there are a large number of documents it can be difficult to cross-reference the documents, provide version control for the documents and control document workflow among multiple authors.

The second solution involves maintaining a relational database that includes entries for machines and software programs. The relational database can define relationships through associations between database entries according to a database schema, with the database schema being based on known relationships. As new relationships develop or old relationships disappear, the database schema, and potentially the SQL statements required to utilize the underlying data, must typically be updated. This can be a time consuming and error prone process.

SUMMARY OF THE INVENTION

Embodiments of the present invention provide systems and methods of relationship management that eliminate, or at least substantially reduce, the shortcomings of prior art relationship management systems and methods.

One embodiment of the present invention can include a computer program product comprising a computer program stored on a computer readable storage medium. The computer program can comprise instructions executable by a processor to maintain a first component representing a first entity in a system, maintain a second component representing a second entity in the system, maintain a relationship discovery rule, apply the relationship discovery rule to determine if the second component should be in a relationship with the first component and establish the relationship if it is determined that the second component should be in a relationship with the first component. According to one embodiment of the present invention, the relationship and components can be stored according to a generic data model.

Another embodiment of the present invention can include a method for discovering relationships. The method can include maintaining a first component representing a first entity in a system, maintaining a second component representing a second entity in the system, maintaining a relationship discovery rule, applying the relationship discovery rule to determine if the second component should be in a relationship with the first component and establishing the relationship if it is determined that second component should be in a relationship with the first component.

Embodiments of the present invention provide an advantage over prior art systems by providing for automatic discovery of relationships.

Embodiments of the present invention provide another advantage over prior art systems by allowing relationships to be stored as data in a database table. Because relationships are stored as data rather than through table relationships in the database schema, relationships can be created, deleted or updated with little or no change to the database schema.

Embodiments of the present invention provide yet another advantage over prior art systems by allowing new relationships to be established automatically as components in the data model are changed. This can save time and reduce human error in establishing relationships.

BRIEF DESCRIPTION OF THE DRAWINGS

A more complete understanding of the present invention and the advantages thereof can be acquired by referring to the following description, taken in conjunction with the accompanying drawings in which like reference numbers indicate like features and wherein:

FIGS. 11-14 include a representation of embodiments of tables associated with a table structure schema applied to a specific example;

FIGS. 15-16 include a representation of alterations to the tables depicted in FIGS. 12 and 14;

DESCRIPTION OF PREFERRED EMBODIMENTS

Figure 1:
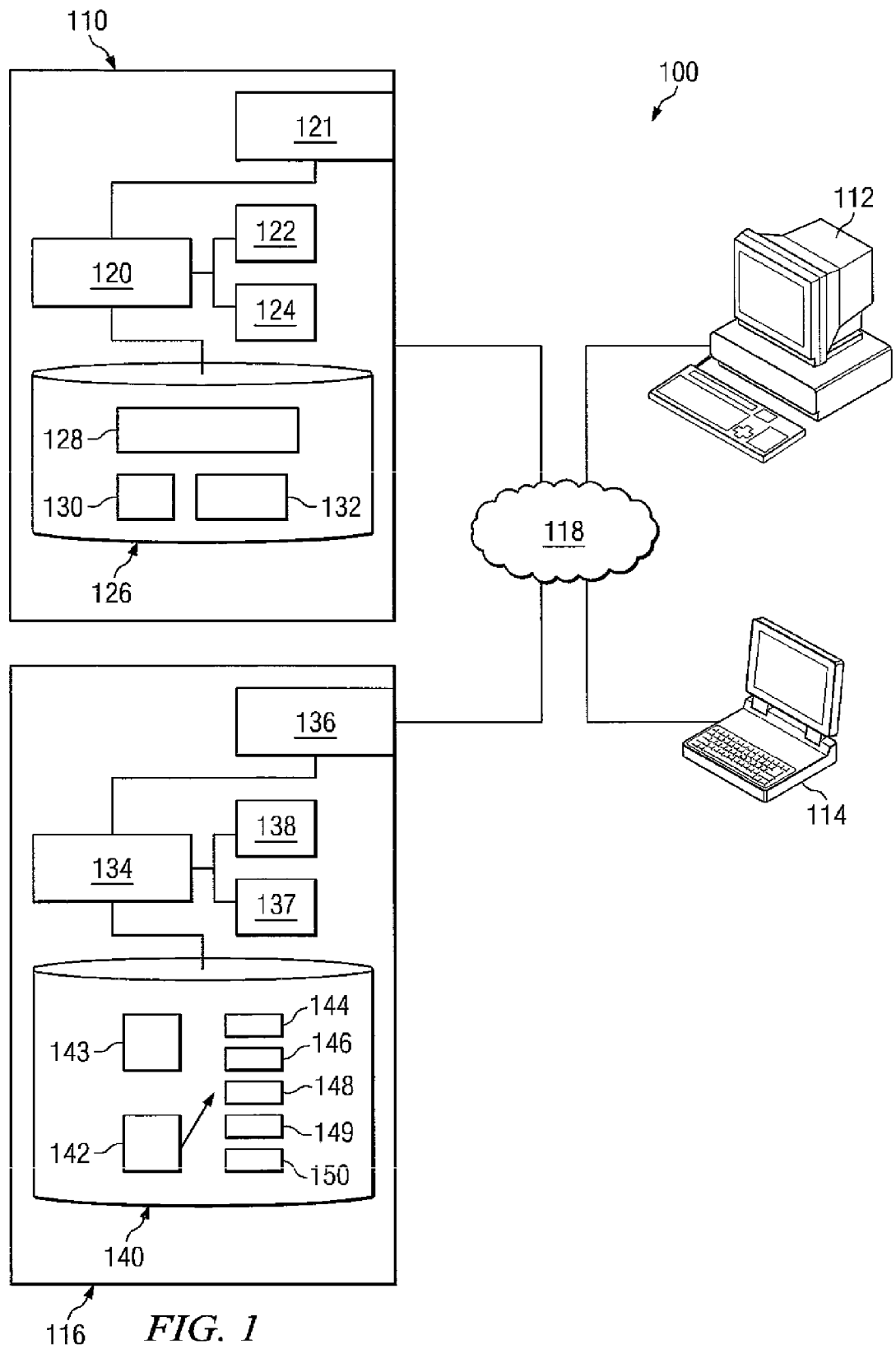
FIG. 1 is a diagrammatic representation of an example IT system for which relationships can be discovered according to one embodiment of the present invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

For purposes of this application a "relationship" is a representation of an association or a dependency between two or more entities in a system being modeled. A "component" is a data representation of any definable, logical or physical entity. A "check" is a determination of whether a particular relationship is valid or a determination regarding the value or validity of a property of a component. Checks can be associated with components or relationships. A "property" is a characteristic associated with a relationship or component. A "relationship type" is a category of relationship and a "component type" is a category of component. Each relationship of the same relationship type and each component of the same component type can have the same properties, though each instance of a component or relationship can have different values for those properties.

Embodiments of the present invention provide systems and methods for relationship discovery. According to one embodiment of the present invention, arbitrarily complex relationship discovery rules can be applied to components in a data model to determine if a relationship exists between the components. If the components satisfy a relationship discovery rule, a relationship can be established for the components. Because the relationships are established based on the application of relationship discovery rules rather than through enforcement of a database schema, new relationships and relationship types can be established without having to alter the underlying database schema. Additionally, because rules can be repetitively applied, relationships can be established, deleted and updated as the system being modeled changes.

As an example, a particular computer in an IT environment can be represented with a component having attributes associated with the computer (e.g., amount of free memory, CPU and so on) and a software program can be represented by a component having attributes of the program. One or more relationship discovery rules can be applied to the computer component and software program component to determine if the computer has sufficient RAM to run the software program and an operating system ("OS") type that can support the software program. If the criteria of the rules are satisfied, a relationship can be established linking the software program component to the computer component, indicating that, in the IT environment being modeled, the computer system can support the software program. The relationship discovery rules applied to components can be arbitrarily complex, and can be applied globally or to a limited number of components. Application of a particular relationship discovery rule can bind zero components if the criteria of the rule are not satisfied, or two or more components if the criteria are satisfied.

According to one embodiment of the present invention, entities in a system and their interactions can be modeled using a generic data model such as that described in U.S. patent application Ser. No. 10/802,304, entitled "Method and System For a Generic Data Model", filed Mar. 17, 2004, by Miller et al. (the "Generic Data Model Application"), which is fully incorporated by reference herein. Components for the generic data model can be established in any automated or manual manner as would be understood by those of ordinary skill in the art. Each component, when established, can be associated with one or more relationship discovery rules. The relationship discovery rules can be periodically applied by, for example, execution of a software program to determine if relationship between the associated component and one or more other components should be established or changed. If a relationship is established, it can be stored in a database table or other data storage format known in the art.

FIG. 1 is a diagrammatic representation of a system 100 for which relationships can be established, according to one embodiment of the present invention. For the sake of example, system 100 can be an IT environment that includes a server computer 110, a client computer 112, a client computer 114 and a management computer 116 connected via network 118 (e.g., a LAN, a WAN, the Internet or other communications network known in the art). Server computer 110 can include a central processing unit ("CPU") 120, a network adapter 121, a read-only memory ("ROM") 122, random access memory ("RAM") 124, a secondary storage medium 126 (e.g., a hard drive, an optical drive, memory or other storage medium known in the art). Secondary storage medium can store computer instructions related to an operating system 128, a web server program 130 and a database server program 132. At any time during execution, a portion of the instructions for operating system 128, web server 130 and database server 132 can be stored in RAM 124.

Management computer 116 can include a central processing unit 134, a network interface device 136, ROM 138, RAM 137 and a secondary storage medium 140 (e.g., a hard drive, an optical drive, memory or other storage medium known in the art). Secondary storage medium 140 can store a system modeling program 142 and operating system 143. During execution, instructions associated with system modeling program 142 or operating system 143 can be stored on secondary storage medium 140 and in RAM 137. Management computer 116 and server computer 110 can further include input devices, output devices, controllers and other computer components known in the art. Client computer 112 and client computer 114 can also include processors, controllers, memories, software applications and other computer components.

According to one embodiment of the present invention, system modeling program 142 can be executable to maintain a data model with data representations (i.e., components) for entities in IT system 100. The components can be arbitrarily defined based on the data model format and the system being modeled. In the example of FIG. 1, system modeling program 142 can maintain component 144 for server computer 110, component 146 for web server program 130, component 148 for database server program 132, component 149 for client computer 112, component 150 for client computer 114 and other components to represent additional entities in system 100. Each component can include properties for attributes associated with an entity. As an example, properties for component 144 can be the name of server computer 110, the OS type running on server computer 110, amount of RAM at server computer 110, and amount of free storage space on server computer 110. As another example, properties for component 146 associated with web server 130 can include a required amount of RAM to run web server program 130 or the logical port number over which web server 130 communicates data to a database. The components can be maintained as described in the Generic Data Model Applications or in any manner as would be understood by those of ordinary skill in the art.

If system modeling program 142 only maintains components representing entities in system 100, the data model will simply be an inventory of entities in system 100. To better understand how system 100 functions, relationships are desired. According to one embodiment of the present invention system modeling program can automatically discover relationships based on the application of relationship discovery rules to the components. The relationship discovery rules can be applied to consistently create relationships representing interdependencies between entities.

Figure 2A:
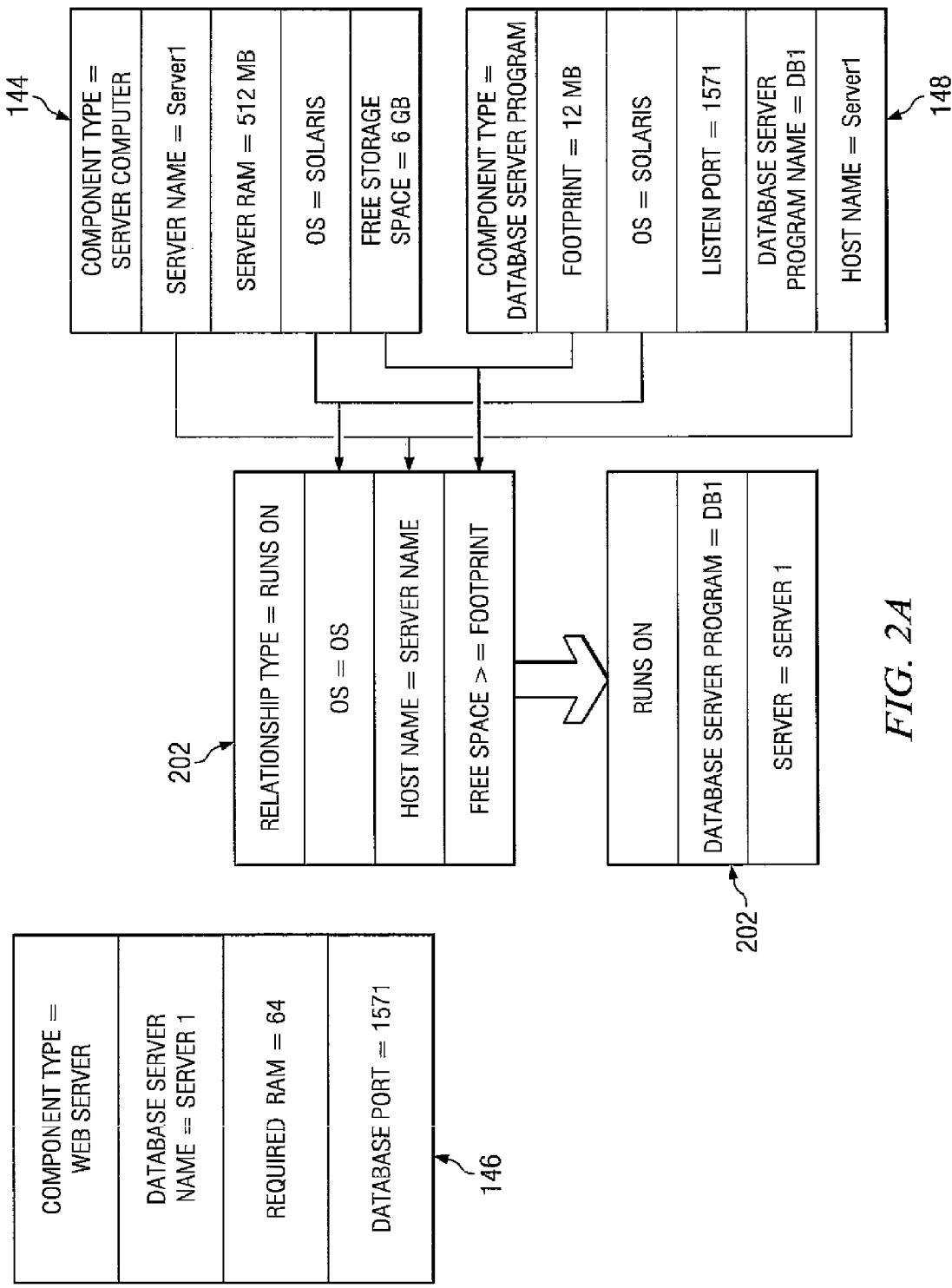
FIGS. 2A and 2B are diagrammatic representations of one embodiment of discovering relationships according to a relationship discovery rule.
Figure 2B:
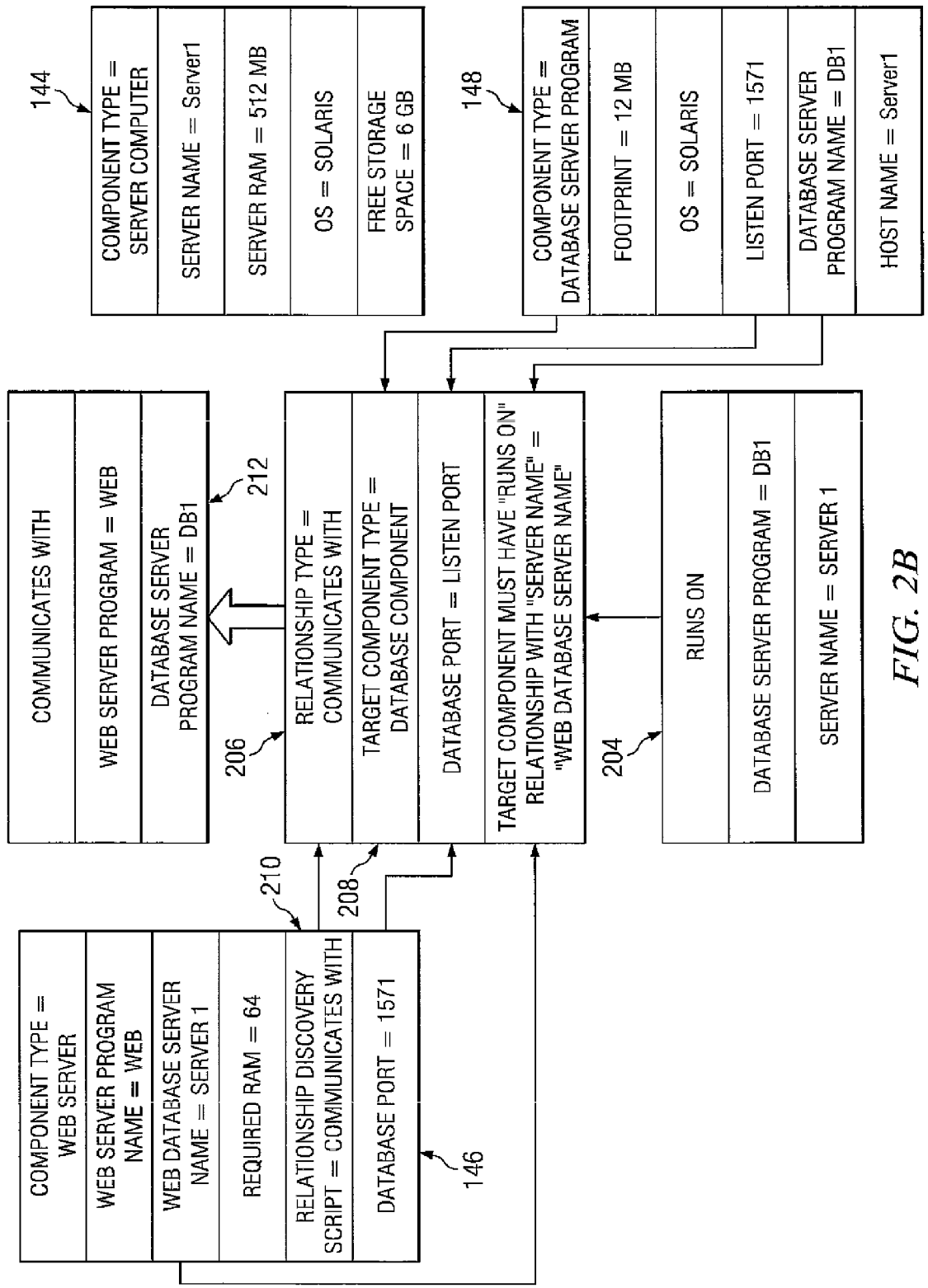

FIGS. 2A and 2B are diagrammatic representations of one embodiment of discovering relationships for entities in an IT system. A computer program (e.g., system modeling program 142) can maintain components representing entities in an IT system. Using a portion of system 100 from FIG. 1, the computer program can maintain a data model including component 144 to represent server computer 110, component 146 to represent web server 130 and component 148 to represent database server 150. Each component can contain properties associated with the corresponding entity. By way of example, but not limitation, component 144 can include a component type, and properties for a Server Name, OS type, RAM and Free Storage, component 146 can include a component type, and properties for OS type, web server program name, required RAM, and Database Port and component 148 can include a component type, and properties for OS type, database server name, footprint size, database server program name, host name and listen port.

Additionally, the computer program can maintain relationship discovery rules to be applied to components to determine if a relationship exists. The relationship discovery rules, in one embodiment of the present invention, can be implemented as a script, such as a JAVA script, that can analyze particular components or existing relationships. As an example, a relationship discovery rule 202 can be established for a "Runs On" relationship that specifies that if the following criteria are met a "Runs On" relationship should be established: the OS property in the two components match, the Free Space available in one component is greater than or equal to the footprint of the other component, and the "host name" value equals a "server name" value.

During execution of the script associated with relationship discovery rule 202, the data values associated with the components in the data model can be examined with respect to the criteria established in the relationship discovery rule. In this case, "Runs On" relationship 204 can be established between component 144 and component 148 as they meet the criteria of the relationship discovery rule. Relationship 204 represents the fact that database server program 132 of FIG. 1 runs on server computer 110 of FIG. 1.

In the example of FIG. 2A, application of relationship discovery rule 202 only required examining components. However, relationship discovery rules can specify criteria for existing relationships as well. FIG. 2B is a diagrammatic representation of applying a relationship discovery rule associated with a particular component, having a specified target component type and specifying criteria for both components and relationships. In the example of FIG. 2B, relationship discovery rule 206 for a "Communicates With" relationship can be established for a web server program component that has the following relationship criteria: i) another component must be a database server program component (i.e., the target component type 208 be "Database Server Program"), ii) the database server program component must specify a listen port equal to the database port for the web server program component and iii) the database server program component must have a "Runs On" relationship with a server computer with a name that is equal to the database server name for the web server program component (e.g., a name equal to "Server1").

Relationship discovery rule 206 can be associated with particular components by, for example, referencing the relationship discovery rule in the component. In the example of FIG. 2B, component 146 can contain a reference 210 to the "Communicates With" relationship discovery rule 206. By associating relationship discovery rules with particular components, the application of relationship discovery rules to components to which the rule may not be pertinent can be reduced.

When the system modeling program determines that it should run relationship discovery rules, it can determine that it should run relationship discovery rule 206 from reference 210. The system modeling program can execute the script for relationship discovery rule 206 to determine if component 146 should be linked to another component by a "Communicates With" relationship.

Continuing with the previous example, the program can determine that it should apply relationship discovery rule 206 to compare one or more properties of web server program component 146 to components of the component type database server program, as specified by relationship discovery rule 206. In the example of FIG. 2B, component 148 is of the "database server program" component type, satisfying the first criteria of relationship discovery rule 206. Therefore, system modeling program can continue to apply the criteria of relationship discovery rule 206 to component 148. In this case, the listen port (i.e., port 1571) of component 148 equals the database port specified in the web server program component 146, satisfying the second criteria of relationship discovery rule 206.

With respect to the third criteria, relationship discovery rule 206 can be further executable to use the database server program name (i.e., "DB1") from database server program component 148 to search the existing relationships to determine if database server program component 148 is in a "Runs On" relationship with a server computer having a name equal to the web database server name specified in component 146, in this case a server computer having the name "Server1." "Runs On" relationship 204 satisfies this criteria. Because component 148 satisfies all of the criteria of relationship discovery rule 206 with respect to component 146, "Communicates With" relationship 212 can be established. This relationship indicates that web server program 130 of FIG. 1 communicates with database server program 132 of FIG. 1.

The components, relationships and relationship discovery rules described in FIG. 2A and FIG. 2B are provided by way of example and not limitation. The relationship discovery rules can be arbitrarily complex and can be applied to components on a predetermined schedule. Consequently, relationships can be established, deleted and updated regularly. The data associated with relationships, in one embodiment of the present invention, can be stored in one or more database tables separate from the tables that store data corresponding to components. Thus, relationships can be enforced through program objects rather than the database schema.

Figure 3:
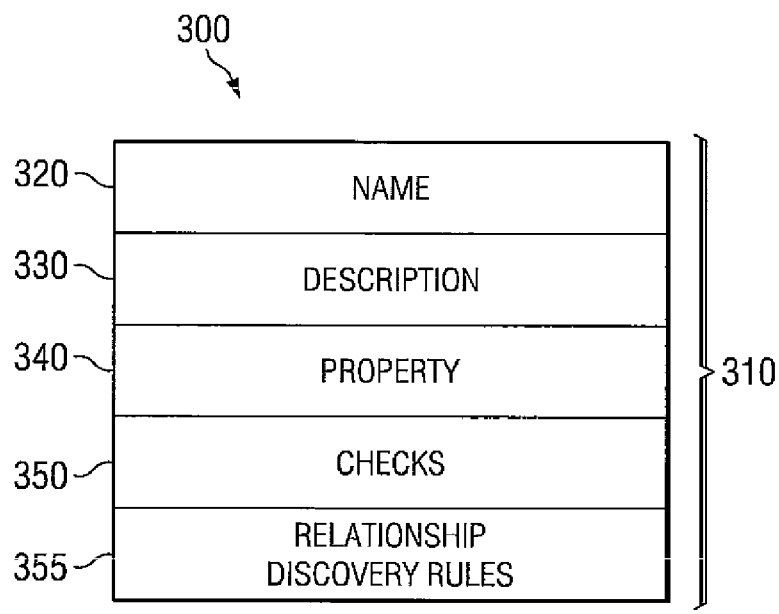
FIG. 3 is a diagrammatic representation of one embodiment of a component.

According to one embodiment of the present invention, relationships can be established or discovered from components of a generic data model according to the Generic Data Model Application. FIGS. 3-16 discuss one embodiment of a generic data model. FIG. 3 is a graphical representation of a component data structure, according to one embodiment of the present invention. Component 300 is a generic component which can be used to represent a logical or physical entity within an environment. Component 300 can have a set of fields 310 which contain information relating to the entity associated with component 300. Fields 310 can include a field for name 330, description 330, properties 340, checks 350 and relationship discovery rules 355. Various other fields 310 can be included to further define component 300. Name field 330 can be used to particularly associate component 330 with a specific physical or logical entity. Description field 330 can further identify component 300, associate component 300 with a particular entity, or allow component 300 to be associated with a particular component type (as explained below).

According to one embodiment of the present invention property field 340 can be used to represent the attributes or characteristics of the physical or logical entity represented by component 300, or with which component 300 is associated. Property field 340 can be associated with one or more properties; a property can consist of a property name which can be associated with a value. This value in turn can correspond to an attribute of the physical or logical entity represented by component 300. A property can be a string, boolean, decimal, date/time, number or an enumerated type, which describes the category of values a particular property can have. In one embodiment, a property can in turn be a data structure which has a name, a description, and a value. This data structure can then be given values based on an attribute of the entity represented by component 300.

Component 300 can also be related to a set of checks 350. A check can be a piece of logic which performs operations based on a certain set of conditions. These operations can consist of checking on the status of certain relationships associated with the component 300, checking the status of certain properties 340, and other operations which will be readily apparent. These pieces of logic can be configured to operate automatically at certain time intervals, or can be applied at any point according to a variety of different triggering conditions which will be apparent to one of ordinary skill in the art after reading this disclosure.

Additionally, component 300 can include a field for relationship discovery rules 350. The field, according to one embodiment of the present invention, can name a particular script or scripts that define the relationship discovery rules. The software program executing the relationship discovery rule can read the script name in field 355, find the named script and execute the named script. In an embodiment of the present invention, field 355 can contain the programming logic for the relationship discovery rule.

Referring briefly back to FIG. 1, component 300 can be used to represent any object in IT environment 100. To represent server computer 110, name field 320 can be set to "server1", description 330 can be set to "server computer", property field 340 can contain three properties "OSType", "RAM", and "FreeStorageSpace", which can be assigned the values corresponding to the attributes of server computer 110, "Solaris", "512 MB" and "6 GB" respectively.

Similarly, if component 300 can represent database server 120, name field 320 can be set to "DB1", description 330 can be set to "database server program", property field 340 can contain three properties "OS", "Footprint", "Listen Port" and "Host Name", which can be assigned the values corresponding to the attributes of database server 132 of FIG. 1, "Solaris", "12 MB" and "1571" respectively. As can be seen, component 300 can represent any entity, whether logical or physical equally well.

Figure 4:
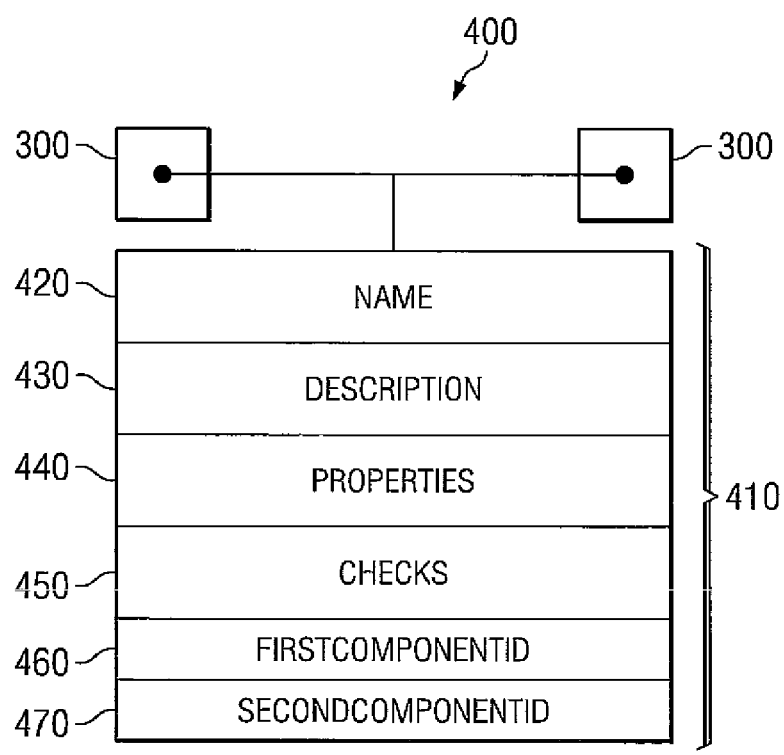
FIG. 4 is a diagrammatic representation of one embodiment of a relationship.

Turning now to FIG. 4, a graphic representation of a relationship is depicted. Relationship 400 can be used to represent an association or dependency between two or more components 300. Relationship 400 can have a set of fields 410 which contain information pertinent to an association or dependency between two components. Fields 410 can include a field for name 420, description 440, property 440, and checks 450 as described above with respect to component 300. Name field 420 can be used to particularly associate relationship 400 with two or more physical or logical entities. In one embodiment, the name associated with name field 320 may be built programmatically based on the relationship type name and the names of the two components it is connecting. So, a "runs on" relationship type exists between component "app1" and "server1", the relationship name may be built automatically as "app1 runs on server1". That way, if either of the components' names changes, the relationship name may automatically changes to reflect this. Description field 440 can further distinguish relationship 400, associate relationship with components, or allow relationship 400 to be associated with a particular relationship type (as explained below). Property field 440 can allow attributes of the relationships, dependencies between the relationships, or associations between the relationships, to be represented by a name and value pair. Checks 450 can contain one or more pieces of logic which perform operations based on certain set of conditions, as described above. In a particular embodiment, fields 410 include fields 460, 470 to identify components 300 to which relationship 400 corresponds. Various other fields 410 can be included to further define relationship 400.

Returning for a moment to FIG. 1, relationship 400 can be used to represent any association between the logical or physical entities in IT environment 100. Continuing with the previous example, components according to component 300 can be used to represent server computer 110 and database server program 132, as described above. Description 430 can be set to "Runs On", property field 440 can contain a property "StartDate" which can be assigned the values corresponding to the date on which database server program 132 began executing on server computer 110. To identify the components associated by relationship 400, FirstComponentID field 460 can be set to a name corresponding to database server program 132, in this example "DB1"; likewise, SecondComponentID field 470 can be associated with component 300 representing server computer 110. n one embodiment, row ids in a table are used to associate components with a relationship, thus, if a component is renamed relationships referencing this component do not have to be altered. As can be seen, relationship 400 can represent any association or dependency between any two or more logical or physical entities equally well.

Figure 5:
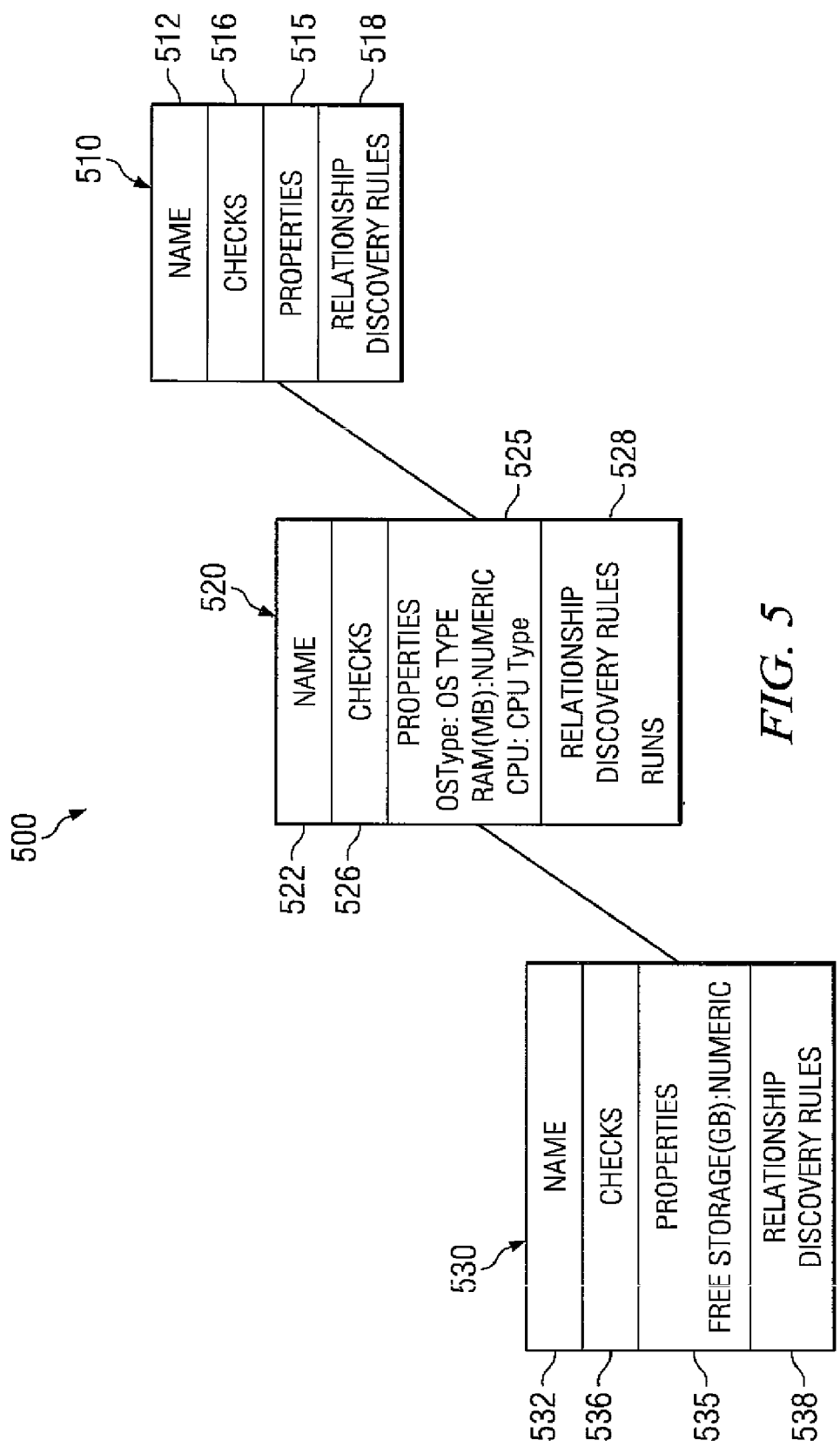
FIG. 5 is a diagrammatic representation of one embodiment of a hierarchy of component types.

However, as can be readily imagined, instantiation and definition of components and relationships for a complex environment can be a manually intensive process. To alleviate these concerns, in one embodiment, a hierarchical system can be included to allow the ability to define a component and relationship types that can serve as templates to instantiate components or relationships of the respective types. FIG. 5 is a diagrammatic representation of one embodiment of a component hierarchy 500. Hierarchy 500 of component types 510, 520, 530 is depicted in FIG. 5. Types 510, 520, 530 can provide different templates for instantiation of different components. Types 510, 520, 530 can have different fields depending on the intended use of a component instantiated from the type. A component can be instantiated from a type and values assigned to the fields of the component based upon the physical or logical entity represented by the component.

Generic component type 510 can have a set of fields as described in conjunction with FIG. 3. These fields can include a name or description 512, a set of properties 514, a set of checks 516 and one or more relationship discovery rules 518. A generic component can be instantiated from generic component type 510, and used to represent a definable entity. For example, in order to represent server computer 110, a user can instantiate component 300 from generic component type 510, name component 300, define the list of properties pertinent to server computer 110, give these properties values based on the attributes of server computer 110, define checks pertinent to server computer 110, define relationship rules pertinent to server computer 110 etc. In this manner, component 300 can be created to represent server computer 110.

In another embodiment of the present invention component types can be defined which serve as templates to instantiate components. For example, a computer component type 520 can be defined to serve as a template for components which represent computers. This computer component type 520 can contain properties 524, checks 526 and relationship discovery rules 528 which are designed to represent a generic computer.

Figure 6:
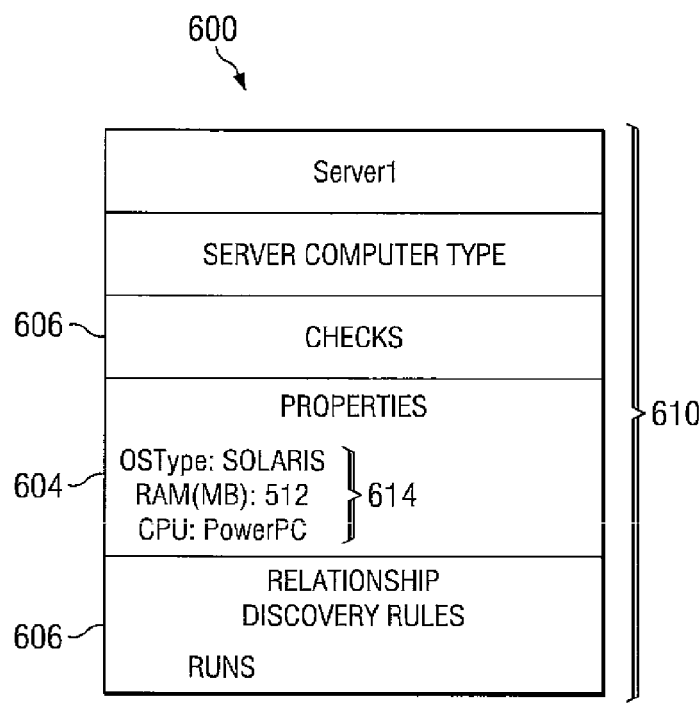
FIG. 6 is a diagrammatic representation of one embodiment of a component instantiated from a component type.

A property within the set of properties 524 can contain a name and enumerated type corresponding to the values which that property can have. As expressed above, a property within the set of properties 524 can itself be a data structure, in this case a property can contain a name and a reference to a data structure. Examples of property names and their corresponding enumerated types are depicted in properties 524 of computer component type 520. Properties 524, relationship discovery rules 528 and checks 526 will be common to all components instantiated from computer component type 520. In other words, all components instantiated from computer component type 520 will contain properties 524, checks 526 and relationship discovery rules 528 of computer component type 520. Component type 520 can be used to instantiate component 300 to represent a computer in an environment, this component's 300 properties can then be assigned values based on the attributes of the computer which component 300 is intended to represent. FIG. 6, discussed below, is a diagrammatic representation of a component based on component type 520.

In some cases computers in an environment may perform a specialized function, such as server computer 110. To represent these specialized machines, it may be desirable to have additional properties in the components representing these specialized machines which are not present in computer component type 520. This discrepancy may be remedied manually; a component of type "computer" may be instantiated from computer component type 520 to represent server computer 110, and any specialized properties desired, but not contained, in this component may be added. Again, however, this process quickly becomes manually intensive when many specialized machines are present.

In some embodiments, a component subtype may be defined with respect to a parent component type. This component subtype represents a specialized subgroup of the respective parent component type. A component instantiated from a component subtype may inherit all the properties and checks corresponding to its respective parent component type. This inheritance mechanism allows the definition of a component subtype to contain only those properties and checks which are desired and which are not contained in the parent component type. Consequently, when component 300 is instantiated from a component subtype, component 300 contains all the properties and checks contained in the definition of the component subtype plus all the properties and checks contained in the definition of the parent component type.

For example, computer component type 520 may be defined to serve as a template for components which represent computers. This computer component type 520 may contain checks 526, properties 524 and relationship discovery rules 528 which correspond to a generic computer, and will be common to all components instantiated from computer type 520. A server computer component subtype 530 may be defined with respect to parent computer component type 520. This definition may include properties 534, checks 536 and relationship discovery rules 538 specific to server computer component subtype 530. Consequently, when a component is instantiated from server computer component subtype 530 this component will contain all the properties 524, 534, checks 526, 536 and relationship discovery rules 528, 538 contained in both the parent computer component type 520 and the server computer component subtype 530. For example, if component 300 was instantiated from server computer component subtype 530, component 300 would contain the properties named "OSType", "RAM", and "CPU" contained in parent computer component type 520, and the property "FreeStorage" contained in server computer component subtype 530. These properties may then be assigned values. Additionally, the component can be associated with the "Runs" relationship discovery rule from computer component type 520.

It will be apparent to those of ordinary skill in the art the recursive nature of this type/subtype correlation and the inheritance characteristics that accompany these correlations. For example, a subtype may be the parent type of a second subtype. In addition to containing the checks and properties defined in the second subtype, a component instantiated from the second subtype will contain the checks and properties defined in both the first subtype and the original parent. The power and flexibility of such a system will also be apparent, a component hierarchy specifically tailored to any environment can be defined from a generic component type.

The relationship discovery rule referenced in field 528 can be associated with each component of component type 520 that is instantiated or each component of component type 530 that is instantiated. Relationship discovery rules referenced in field 538 can be associated with each component of component type 530 that is instantiated.

According to one embodiment of the present invention, a relationship discovery rule can be maintained as a script, such as JAVA script, that is executable to search and analyze data associated with components and/or relationships. Searches of the relationship and component data can be carried out, in one embodiment of the present invention, according to the query scheme described in U.S. patent application Ser. No. 10/803,133, entitled "Method and System for Querying an Applied Data Model" filed Mar. 17, 2004, by Miller et al., which is hereby fully incorporated by reference herein. A component can contain a reference to a script name or the script language itself. When a script referenced by a particular component is executed, the script can load specified values from the component by which the script is referenced and search for other components or relationships that satisfy the criteria of the script.

In the above example, relationship discovery rules are associated with component types, and therefore instantiated components of the component types. However, relationship discovery rules can applied to components in other manners. For example, a script for a new relationship discovery rule can be established by a user (e.g., an administrator or other user with privilege to establish relationship discovery rules). Once the script is established, the user generating the script can be given the option through, for example, a graphical user interface to apply the script to particular components or component types. In this case, the instantiated components may not reference the relationship discovery rule, but the software program running the rule can apply the relationship discovery rule to particular selected components or to components of selected component type(s). In yet another embodiment of the present invention, the relationship discovery rule script itself can specify the components or component type(s) to which it applies. During execution of the script, the software program can search the components to determine whether to apply the criteria of the script to particular components.

FIG. 6 is a depiction of component 600 which has been instantiated from computer component type 520 to represent server computer 110. Component 600 has fields 610 corresponding to the fields defined by computer component type 520, including properties 604, checks 606 and relationship discovery rules 607 contained in the type definition of computer component type 520. The values 614 of properties 604 of component 600 may correspond to characteristics or attributes of server computer 110. If server computer 110 has 512 megabytes of RAM, the property named "RAM" of component 600 may be set to 512. If the operating system implemented on web server is Solaris, the value of the "OSType" property in component 600 may be Solaris, etc. In this manner, component 600 models server computer 110 by representing attributes of server computer 110 with the properties 604 of component 600. Additionally, if component type 520 defines that a computer can run applications, computer component 600, can have an entry referencing a "Runs" relationship discovery rule that can be applied to find components corresponding to applications that run on computer 110.

As described above, relationships are used in tandem with components to model arbitrary systems and environments by representing an association or dependencies between two components. As will be readily apparent, the same reasoning that applies to components with respect to a hierarchy of types may be applied equally well to relationships. Manual instantiation of relationships may be time consuming if the representation of many dependencies or associations is necessary. Consequently, types and subtypes corresponding to a particular category of these dependencies or associations may also be defined for relationships, and relationships instantiated from these defined types and subtypes. All principles described with respect to types and subtypes in the context of components are equally applicable to relationships, including the principle of inheritance.

Figure 7:
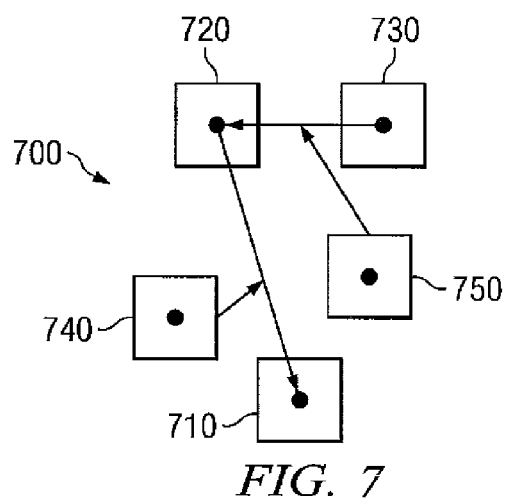
FIG. 7 is a diagrammatic representation of one embodiment of an application of a data model to the IT environment of FIG. 1.

FIG. 7 is a diagrammatic representation of using components and relationships to model a portion of IT environment in FIG. 1 is depicted. Component 710 represents the physical entity server computer 110 and has properties with values corresponding of server computer 110. Components 720 and 730 represent logical entities database server program 132 and web server program 130 of FIG. 1, respectively. Properties of components 720, 730 may have values corresponding to various attributes of database server program 132 and web server program 130. Additionally, each of component 710, 720 and 730 can include a reference to relationship discovery rules that can be executed to generate relationships for the associated component. It should be noted that the same relationship discovery rule can be associated with multiple components.

Relationships can represent the interactions between entities.

As an example, database server program 132 executes on server computer 110. To represent this association, relationship 740 may be named "runs on", with a FirstComponentID field linked to component 720 representing database server program 132, while the SecondComponentID may be linked with component 710 corresponding to server computer 110. Properties of relationship 740 may be defined accordingly. In this manner, the fact that database server program 132 executes on server computer 110 may be modeled by relationship 740. Likewise, the fact that web server program communicates with database server program 132 can be may also be modeled. Relationship 750, of type "Communicates With", may be instantiated linking components 710 and 730, representing that web server program 130 and database server program 132 communicate with each other.

It should be noted that the relationship discovery rules can be associated with components and applied before all the components are instantiated in the data model. For example, if component 720 is instantiated in the data model, but component 710 is not, the relationship discovery rule for the "Runs On" relationship can still be applied. The relationship 740 will not be created, however, as there is no component 710 with which to link component 720. The relationship discovery rules can be applied according to an arbitrary schedule so that new relationships can be created or invalid relationships identified. In this case, the first time that the relationship discovery rule for the "Runs On" relationship is applied after component 710 is added to the data model, relationship 740 can be established. If component 710 is later removed, application of the relationship discovery rule for the "Runs On" relationship will not yield relationship 740, indicating that relationship 740 is now invalid. In another embodiment of the present invention, validity of relationships can be determined by running checks from the relationship or the constituent components.

Figure 8:
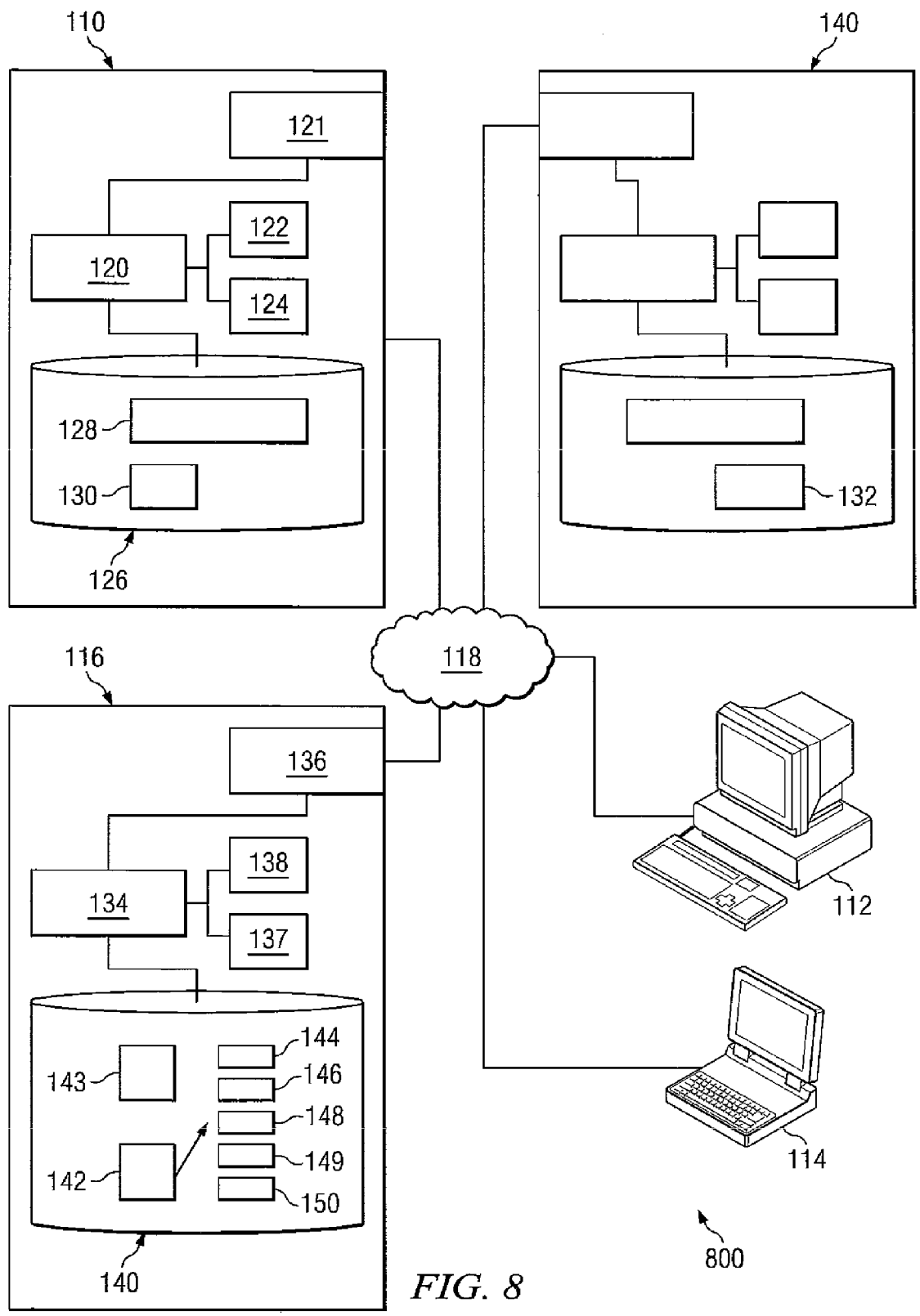
FIG. 8 is a diagrammatic representation of one embodiment of an alteration to the IT environment of FIG. 1.

FIG. 8 illustrates how relationships can change with changes of the IT system being modeled. Suppose that the IT environment depicted in FIG. 7 is altered to the IT environment depicted in FIG. 8. The IT environment now includes second server computer 140, with database program 132 executing on second server computer 140. Server computer 110 and web server program 130 can remain unaltered. The application of relationship discovery rules to the augmented IT environment 100 can, as will be described in conjunction with FIG. 9, help identify a possible problem with the update to IT environment 100.

Figure 9:
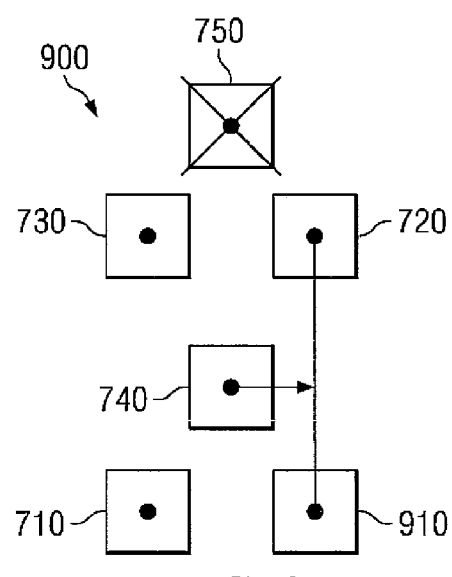
FIG. 9 includes a representation of an application of a data model to the IT environment of FIG. 7.

FIG. 9 is a diagrammatic representation of an application of embodiments of the data model to the IT environment depicted in FIG. 8. Component 910, representing second server computer 140, has been added to the model. Properties of component 910 have values corresponding to attributes of second server computer 140. Components 710 and 730 remain unaltered, as the entities which they represent remain unchanged, however the host name of component 720 can be updated to "Server2" reflecting the fact that database server program 132 now runs on server computer 140. Consequently, when the "Runs On" relationship discovery rule is applied after the IT environment changes as depicted in FIG. 8, relationship 740 is altered as the "host name" in component 720 has changed.

With respect to application of the "Communicates With" relationship discovery rule, the "Communicates With" relationship discovery rule, using the example of FIG. 2B, requires that a database server program component (i.e., component 720) is in a "Runs On" relationship with a server computer component having a name equal to the database name in web server program component 730 (i.e., "Server1"). Because database server program component 720 is no longer in a "Runs On" relationship with a server computer component having the name "Server1", relationship 750 will not be formed when the relationship discovery rule is applied, indicating that existing relationship 750 is no longer valid. If web server program 130 is intended to save data to a database, this can indicate an error in IT environment 100, in that web server program 130 is no longer in a relationship with database server program. As can be seen, changes to a particular environment can be easily accommodated by the data model with a minimum of change to the actual data structures which represent the environment. Additionally, the ability to run relationship discovery rules as the IT environment changes allows the data model to be easily updated and problems with the changes to be detected.

Figures 10, 10A:
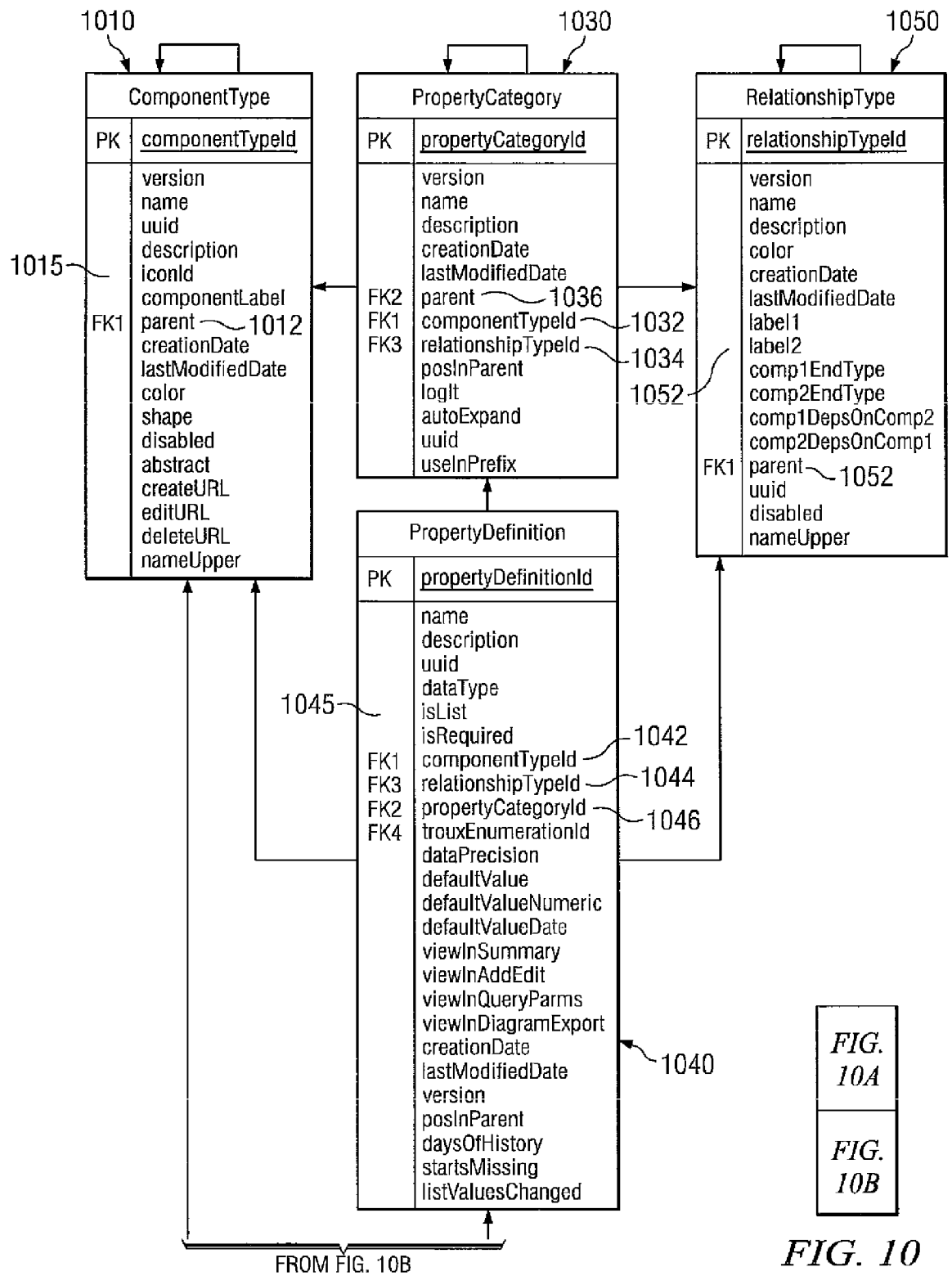
FIG. 10 is a diagrammatic representation of one embodiment of a table structure schema for implementing a generic data model.
Figure 10B:
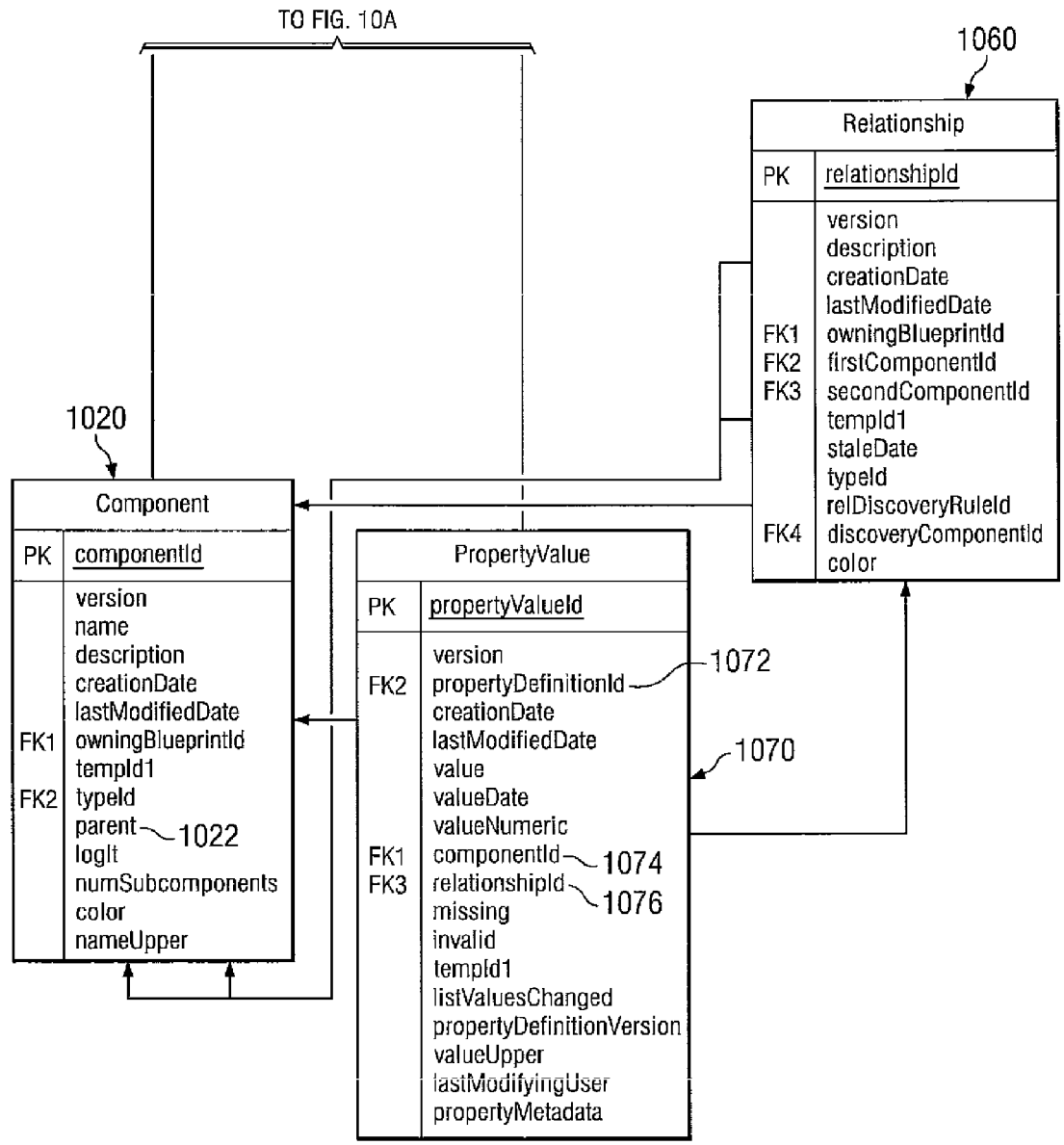

According to one embodiment of the present invention, data structures corresponding to a particular data model may be stored in a schema which allows the addition of components, relationships, properties and types without any change to the underlying schema used to represent these data structures. FIG. 10 depicts one embodiment of a table schema which may be utilized with embodiments of the present invention to store data structures, such that the table schema will not have to be altered with the addition of a new data structure, or an alteration to an already existing data structure. Table schema 1000 contains ComponentType table 1010, Component table 1020, PropertyCategory table 1030, PropertyDefinition table 1040, PropertyValue table 1070, RelationshipType table 1050 and Relationship table 1060.

ComponentType table 1010 may define component types (as discussed above), and contain a set of columns 915 related to fields of a component type. "Parent" column 1012 may be used to represent the parent of a component type, in this case each subtype contains a reference to its parent component type.

RelationshipType table 1050 is constructed substantially the same as ComponentType table 1010 and contains a set of columns 1055 including a parent column 1052.

PropertyCategory table 1030 may also contain a set of columns 1035 related to the definition of a property. PropertyCategory table 1030 may define categories of properties, and provide a hierarchical structure for properties based on a type. For example, on computer component 520 of FIG. 5, there may be three divisions of properties, hardware information, operating system information and IT personnel information. Rather than having these properties mixed together as one large group, it may be helpful to divide these properties into three separate categories. Categories within PropertyCategory table 1030 may form an arbitrarily deep tree, where any category in the tree can contain property definitions.

Each category within PropertyCategory table 1030 may be associated with a component type or relationship type. In one particular embodiment, this association may be through the componentTypeId field 1032 or relationshipTypeId field 1034 respectively, while an association with a parent category may be established through the parent field 1036.

PropertyDefinition table 1040 may contain definitions of particular properties defined by columns 1045. Properties within PropertyDefinition table 1040 may be defined with respect to a category, and may contain a link to this category in propertyCategoryID field 1046. To increase performance, property definitions may also have links back to the component type or relationship type with which they are associated through the componentTypeId field 1042 or relationshipTypeId field 1044 respectively. Property definitions within PropertyDefinition table 1040 may also provide meta information such as name, or input/output attributes. In one embodiment, these definitions do not have values, they only describe what properties exist with respect to a component type or relationship type, not the values these properties actually have.

Relationships are stored in the Relationship table 1060. Relationships are associated with components through firstComponentID field 1062 and secondComponentID field 1064, and may have a link to their relationship type through typeID field 1066. Note that this representation depicts relationships as having two ends (that is, they are binary), those of ordinary skill in the art will realize after reading this disclosure that other database schemas could be created that allow relationships to have arbitrary numbers of components simply by removing the firstComponentID and secondComponentID fields from relationship table 960 and creating a new table called RelationshipToComponent that has two columns: a relationship ID and a component ID. Each relationship would have n rows in this table corresponding to the n components attached to the relationship.

Components are stored in the Component table 1020. Components may be linked to their type through typeID field 1022. Components in turn may have subcomponents, which in turn can have subcomponents etc. Thus, components may form hierarchies of arbitrary depths. This containment correlation should not be confused with the type/subtype correlation descried above. For example, a database component may contain table subcomponents, which contain column subcomponents etc. Yet no inheritance is implied, since a column is not a table, which is not a database etc. These component hierarchies are established through the parent field 1022 which may link a subcomponent with its parent component.

PropertyValue table 1070 may be used to associate a value with a property definition for a particular component or relationship. Each property value within PropertyValue table 1070 may have a link to a property definition using the field propertyDefinitionID 1072, and a link to either the component or relationship with which it is associated using componentID 1074 or relationshipID 1076.

To illustrate why a schema of this type may remain static whenever a new property, component or relationship is added, an example is helpful. Suppose there are two components in an environment, "Server1" and "Server2", and both these components have been instantiated from the one component type, "ComputerType". Component type "ComputerType" has three properties defined with respect to it, "RAM", "OSType" and "FreeStorage". Therefore, "Server1" and "Server2" both have three values associated with these properties.

FIGS. 11-13 illustrate what the tables might look like for such an example. FIG. 11 illustrates ComponentType table 1100 containing "ServerComputerType" component type, with a ComponentTypeId of 1. FIG. 12 shows PropertyDefinition table 1200 containing the definition of three properties "RAM", "OSType", "CPUType" and FreeStorage", and their respective PropertyDefitionIDs 1, 2, 3 and 4. These property definitions are all linked through ComponentTypeID field to ComponentTypeID 1, corresponding to "ComputerType" component type as illustrated in ComponentType table 1100.

FIG. 13 illustrated Component table 1300, containing components "Server1" having ComponentID 1 and "Server2" having ComponenID 2. Both component are linked with ComponentTypeID 1 corresponding to "ServerComputerType" component type, as contained in ComponentType table 1100. Consequently, each component "Server1" and "Server2" will have the properties "RAM", "OSType", "CPUType" and "FreeStorage" identified in PropertyDefinition table 1200, along with their corresponding values.

These properties and values are illustrated in FIG. 14. PropertyValue table 1400 contains a ComponentID linked with a PropertyDefinitionID associated with a Value. For example the first row 1410 in PropertyValue table 1400 contains ComponentID 1, corresponding to "Server1", linked to PropertyDefinitionID 1, associated with a Value of 512. ComponentID of 1 identifies component "Server1" as illustrated in Component table 1300, while PropertyDefinitionID 1 identifies the PropertyDefinition "RAM" as shown in PropertyDefinition table 1200. Consequently, the property "RAM" of component "Server1" will have the value 512.

Now, suppose it is desirable to model another type of property, called "Cache", with respect to "ComputerType" component shown in ComponentType table 1100. Rather than having to add new tables or columns to the table schema, all that may be required is the addition of rows to the existing table.

FIGS. 15 and 16 illustrate the changes to the existing tables that may occur to model the property "Cache" in the context of the present example. FIG. 15 illustrates the addition of the PropertyDefinition "Cache" to PropertyDefinition table 1200. Row 1510 of PropertyDefinition table 1200 contains the definition of the property "Cache", and its PropertyDefinitionID 5. This property definition is linked through ComponentTypeID field to ComponentTypeID 1, corresponding to "ServerComputerType" component type as illustrated in ComponentType table 1100. PropertyDefinition "Cache" is now added to the data model, and associated with component type "Server ComputerType", consequently, components "Server1" and "Server2" of component type "Server ComputerType" will now be associated with the PropertyDefinition "Cache" and have values for this property.

The addition of these properties and values is illustrated in FIG. 16. Row 1420 in PropertyValue table 1400 contains ComponentID 1, corresponding to "Server1", linked to PropertyDefinitionID 4 and associated with a Value of 2. ComponentID of 1 identifies component "Server1" as illustrated in Component table 1300, while PropertyDefinitionID 4 identifies the PropertyDefinition "Cache" as shown in row 1210 of PropertyDefinition table 1200. Consequently, the property "Cache" of component "Server1" will have the value 2. Similarly, Row 1430 in PropertyValue table 1400 contains ComponentID 2, corresponding to "Server2", linked to PropertyDefinitionID 4 and associated with a Value of 1. ComponentID of 2 identifies component "Server2" as illustrated in Component table 1300, while PropertyDefinitionID 4 identifies the PropertyDefinition "Cache" as shown in row 1210 of PropertyDefinition table 1200. Accordingly, the property "Cache" of component "Server1" will have the value 2. The property "Cache" has been added to the data model, associated with components and component types and given values, however, the underlying table schema has not been altered.

Data associated with relationships can be stored in a similar manner. A relationship can link particular components by containing the component IDs in the database entry for the relationship. The relationship tables can be modified as described in conjunction with components. Because the relationships are established through data in the database, rather than the database schema, relationships can be added, deleted or updated without changing the database schema. It will be apparent to those of ordinary skill in the art that these same methodologies may be applied to add, or delete, any element or structure from a data model without altering the underlying schema.

Figure 17:
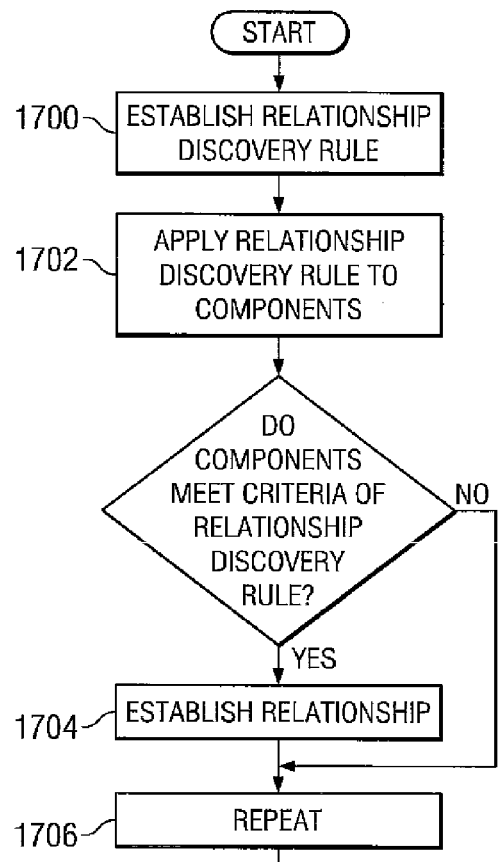
FIG. 17 is a flow chart illustrating one embodiment of a method for discovering relationships.

FIG. 17, is a flow chart illustrating one embodiment of a method for discovering relationships. The method of FIG. 17 can be implemented, according to one embodiment of the present invention by execution by a processor of a computer program (i.e., system modeling program 142 of FIG. 1) stored on a computer readable medium accessible by the processor. At step 1700, a relationship discovery rule can be established that has one or more criteria. According to one embodiment of the present invention, the relationship discovery rule can be a JAVA script program executable to compare components or relationships to arbitrary criteria established in the script.

At step 1702, the relationship discovery rule can be applied to evaluate a first component and a second component based on the criteria specified in the relationship discovery rule. According to one embodiment of the present invention, the relationship discovery rule can be executed to search underlying database tables for relationship or components for particular data values and compare one or more of the values to predefined criteria. The relationship discovery rule can determine if the second component should be in a relationship with the first component based on data values associated with the first or second component, comparisons between data values associated with the first component and second component, relationships associated with the first or second component and other factors established by the relationship discovery rule. If the criteria of the relationship discovery rule are met, a relationship can be established at step 1704. Otherwise, the relationship will not be established. The process of FIG. 17 can be arbitrarily repeated (step 1706).

Figure 18:
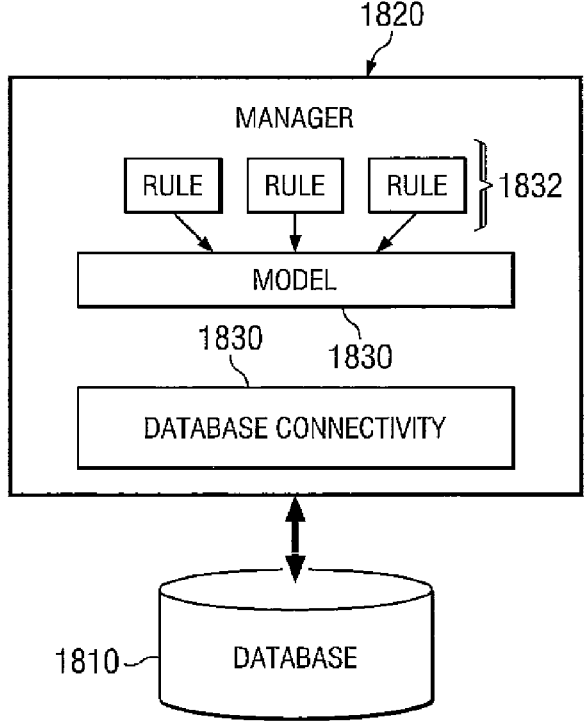
FIG. 18 is a diagrammatic representation of one embodiment of a software architecture for implementing the systems and methods described.

FIG. 18 illustrates one possibility for an architecture to implement, store and access a data model, and the associated table schema and applied data models, implemented in accordance with described embodiments. System architecture 1800 consists of manager 1820, model 1830, database connectivity 1840 and database 1810. In one embodiment, database 1810 is configured to store the tables schema associated with the data model implemented by model 1830. Database 1810 may be a Microsoft SQL server, an Oracle database, IBM DB2, or the like. As will be readily apparent to those of ordinary skill in the art, many sorts of databases may be used to implement these table schemas.

Model 1830 may implement a data model, and the applied data models created using the data model. Model 1830 is responsible for creating the components, relationships, properties and blueprints which may make up an applied data model. These elements of an applied data model may then be stored in the table schema implemented in database 1810. Model 1830 may access these stored elements and make alterations to the applied data model. In one embodiment, to access database 1810, model 1830 may issue an SQL statement, as is commonly known in the art.

Model 1830 may access database 1810 through database connectivity 1840. Database connectivity 1840 may serve as an interface between model 1830 and database 1810. This may consist of translating statements or queries issued by model 1830 into commands which database 1810, or database management system (DBMS) associated with database 1810, may understand. In one particular embodiment, database connectivity 1840 is a standard database access methodology such as Java Database Connectivity (JDBC) or Open Database Connectivity (ODBC) capable of translating SQL commands issued by model 1830 into commands capable of execution by a DBMS associated with database 1810.

Manager 1820 may be a set of services intended to aid in the management, control and access of model 1830. Manager 1820 may be an abstraction layer that allows access to model 1830 from other application which utilize model 1830. As the complexity of model 1830 increases it becomes increasingly difficult to glean desired information, or associations from model 1830. To combat this problem, manager 1820 may provide an efficient system for accessing and retrieving information contained in model 1830. Additionally, manager 1820 can access and implement relationship discovery rules 1832 to determine if relationships should exists between components in data model 1830. The relationship discovery rules can be applied to the components at any time, allowing manager 1820 to automatically update the relationships in model 1830 as the components change. Since the relationships can be stored as data structures in database tables, the relationships can be updated without changing the underlying database schema.

While the present invention has been described with reference to particular embodiments, it should be understood that the embodiments are illustrative and that the scope of the invention is not limited to these embodiments. For example, relationship discovery rules can be applied to components stored in a variety of formats that model any type of system that can be represented with a data model. The relationship discovery rules can be implemented as scripts, portions of a larger program, independent programs, modules of a program or according to any suitable programming architecture in any language as would be understood by those of skill in the art. Many variations, modifications, additions and improvements to the embodiments described above are possible. It is contemplated that these variations, modifications, additions and improvements fall within the scope of the invention as detailed in the following claims.

What is claimed is:

1. A computer program product stored on a computer readable storage medium for discovering relationships in an arbitrarily complex environment, the computer program product comprising a computer program, wherein the computer program comprises instructions executable by a processor to:

represent a first entity in a system being modeled with a first component of a first type of component in a data model, wherein the first component has a set of fields which contain information relating to the first entity, wherein at least one field in the set of fields contains information about the first type of component, and wherein the first entity is a logical or physical entity in the arbitrarily complex environment;

represent a second entity in the system being modeled with a second component of a second type of component in the data model, wherein the second component has a set of fields which contain information relating to the second entity, wherein at least one field in the set of fields contains information about the second type of component, and wherein the second entity is a logical or physical entity in the arbitrarily complex environment;

establish, maintain, delete and update one or more relationship discovery rules for analyzing one or more of information contained in one or more fields in the first component and information contained in one or more fields in the second component, one or more of data values associated with the first component and data values associated with the second component, and one or more references to a relationship discovery rule;

select a relationship discovery rule from the set of relationship discovery rules based on the type of component associated with the first component;

associate the selected relationship discovery rule with the first component;

apply the selected relationship discovery rule to the second component;

establish a relationship between the first component and the second component according to the relationship discovery rule, wherein the relationship represents an association between the first entity and the second entity in the system, and wherein each relationship contains a set of fields which contain information pertinent to the association, wherein one field of the set of fields contains information about type of relationship; and repeat one or more of selecting a relationship discovery rule from the set of relationship discovery rules, associating the selected relationship discovery rule with a first component, applying the selected relationship discovery rule with the second component to establish, delete or update a relationship when changes are made to the data model.

2. The computer program product of claim 1, wherein the relationship represents a dependency between the first entity and the second entity.

3. The computer program product of claim 1, wherein the relationship discovery rule further comprises a set of criteria.

4. The computer program product of claim 3, wherein a criterion from the set of criteria specifies that at least one property of the second component must have a particular value.

5. The computer program product of claim 3, wherein a criterion from the set of criteria specifies that the second component must be of a particular component type for the second component to be in the relationship with the first component.

6. The computer program product of claim 3, wherein a criterion from the set of criteria specifies that the second component must be in an already established relationship for the second component to be in the relationship with the first component.

7. The computer program product of claim 1, wherein the first component and the second component are maintained according to a generic data model.

8. The computer program product of claim 7, wherein the relationship discovery rule further comprises an executable script.

9. The computer program product of claim 8, wherein the computer program comprises instructions executable to associate the script with a first component type of which the first component is a member.

10. The computer program product of claim 9, wherein the computer program comprises instructions executable to determine whether the second component should be in a relationship with the first component based on one or more criteria specified in the script.

11. The computer program product of claim 9, wherein the computer program further comprises instructions executable to store the relationship in a first database table.

12. The computer program product of claim 11, wherein the first component and second component are stored in a second database table separate from the first database table.

13. The computer program product of claim 7, wherein the first component and the second component represent entities in an information technology ("IT") environment.

14. A method for discovering relationships in an arbitrarily complex environment, comprising:
representing, by using a computer having a processor, a first entity in a system being modeled with a first component of a first type of component in a data model, wherein the first component has a set of fields, wherein at least one field in the set of fields contains information about the first type of component, wherein the set of fields are defined based on data model format and the system modeled and contains information relating to the first entity, and wherein the first entity is a logical or physical entity in the arbitrarily complex environment;
representing a second entity in the system being modeled with a second component of a second type of component, wherein the second component has a set of fields, wherein at least one field in the set of fields contains information about the second type of component, wherein the set of fields are defined based on the data model format and the system being modeled and contains information relating to the second entity, and wherein the second entity is a logical or physical entity in the arbitrarily complex environment;
establishing, maintaining, deleting and updating one or more relationship discovery rules for analyzing one or more of information contained in one or more fields in the first component and information contained in one or more fields in the second component, one or more of data values associated with the first component and data values associated with the second component, and one or more references to a relationship discovery rule;
selecting a relationship discovery rule from the set of relationship discovery rules based on the type of component associated with the first component;
associating the selected relationship discovery rule with the first component;
applying the selected relationship discovery rule to the second component;
establishing a relationship between the first component and the second component according to the relationship discovery rule, wherein the relationship represents an association between the first entity and the second entity in the system, and wherein each relationship contains a set of fields which contain information pertinent to the association, wherein one field of the set of fields contains information about type of relationship; and
repeating one or more of selecting a relationship discovery rule from the set of relationship discovery rules, associating the selected relationship discovery rule with a first component, applying the selected relationship discovery rule with the second component to establish, delete or update a relationship when changes are made to the data model.

15. The method of claim 14, wherein the relationship represents a dependency between the first entity and the second entity.

16. The method of claim 14, wherein the relationship discovery rule further comprises a set of criteria.

17. The method of claim 1, wherein applying the relationship discovery rule to determine if the second component should be in a relationship with the first component further comprises determining if a property of the second component has a value meeting at least one criterion from the set of criteria.

18. The method of claim 16, wherein applying the relationship discovery rule to determine if the second component should be in a relationship with the first component further comprises determining if the second component is of a particular component type.

19. The method of claim 16, wherein applying the relationship discovery rule to determine if the second component should be in a relationship with the first component further comprises determining if the second component is in an already established relationship.

20. The method of claim 14, further comprising storing the relationship in a first database table.

21. The method of claim 20, wherein the first component and second component are stored in a second database table separate from the first database table.

22. The method of claim 20, further comprising storing the relationship in a database table according to a generic data model.

23. The method of claim 22, wherein the generic data model models an information technology ("IT") environment.

24. The method of claim 14, wherein maintaining a relationship discovery rule further comprises maintaining an executable script.

25. The method of claim 24, further comprising associating the executable script with the first component.

* * * * *